United States Patent [19]

Castiglioni

[11] Patent Number: 4,866,970

[45] Date of Patent: Sep. 19, 1989

[54] APPARATUS FOR THE CONTINUOUS SHEARING OFF AND COLD SWAGING OF METAL WORKPIECES

[76] Inventor: Albino Castiglioni, via Losanna 12, 6900 Lugano, Switzerland

[21] Appl. No.: 726,888

[22] Filed: Apr. 24, 1985

[51] Int. Cl.$^4$ .............................................. B21F 5/00
[52] U.S. Cl. ........................................ 72/337; 72/339; 10/11 T; 10/12 T; 10/13; 10/52; 10/162 S; 226/186; 226/187; 226/190
[58] Field of Search ................................ 72/337–339; 10/11 T, 12 T, 13, 52, 77, 162 S; 226/153, 152, 190, 186, 187; 83/259–261, 602, 597, 580, 582; 403/380

[56] References Cited

U.S. PATENT DOCUMENTS

| | | | |
|---|---|---|---|
| 466,117 | 12/1891 | Cady | 226/153 |
| 651,007 | 6/1900 | Danks | 10/13 |
| 1,185,260 | 5/1916 | Stine | 228/187 |
| 1,356,748 | 10/1920 | Smith et al. | 72/450 |
| 2,266,283 | 12/1941 | Spengler | 74/568 R |
| 3,030,642 | 4/1962 | Fray | 10/15 |
| 3,551,926 | 1/1971 | Ferre | 10/13 |
| 3,693,487 | 9/1972 | Murdock et al. | 83/262 |
| 3,800,348 | 4/1974 | Dunkin | 10/11 T |
| 4,237,566 | 12/1980 | Castiglioni | 10/13 |
| 4,345,451 | 8/1982 | Pamplin et al. | 72/286 |

FOREIGN PATENT DOCUMENTS

78775 5/1983 European Pat. Off. .

Primary Examiner—Daniel C. Crane
Attorney, Agent, or Firm—Young & Thompson

[57] ABSTRACT

Apparatus for the continuous shearing off and cold swaging of metal workpieces, particularly wire material, comprises a device (1') for feeding the material (5), a pivotable shearing device (2), a slide (1) for swaging the sheared-off part, and a die-studded chuck (31). These components are arranged so that they are distributed in the machine frame (11) along the sides of a U. These components can all be driven by a motor (4) via a conventional drive. Feeding of the material (5) in the direction of the chuck (31) takes place with intermittent motion and in synchronism with the movements of the described components of the machine. The production output of finished parts is greatly increased by the chosen arrangement, the intermittent feeding of the material, and the pivotability of the cutter. The slide has a holder (37) for a plurality of tools in sockets (43, 44, 45 or 43', 45'). These sockets, and the axis of the material, lie on an imaginary circle that is of the same diameter as and coaxial with an imaginary circle on which the dies (30) on the chuck lie. Each of those sockets, and the material, is aligned with a respective one of the dies in every stopped position of the chuck, so that a tool held by the slide will strike a shorn-off workpiece every stroke of the slide.

7 Claims, 8 Drawing Sheets

APPARATUS FOR THE CONTINUOUS SHEARING OFF AND COLD SWAGING OF METAL WORKPIECES

The present invention relates to apparatus for the continuous shearing off and cold swaging of metal workpieces, especially wire material.

Conventional machines for shaping metals without cutting, especially for the simultaneous shearing off of the entire material cross section and the swaging of the shearedoff part in the cold state, generally consist of a large number of components, the manufacture of which and the servicing of which during operation are extremely expensive.

In another machine of this type, the movement of the numerous components, all operating synchronously with respect to one another, is furthermore chosen so that successively occurring shifts in the center of gravity or inertial effects during reversals, acting as oscillation sources for all adjacent parts of the machine, cause deleterious frame vibrations with great wear and tear, and low production output.

One device of this type is disclosed in Swiss Pat. No. 461,230.

The starting material is fed in rod shape by means of a set of opposed feed rollers with a uniform peripheral speed of the latter. The free length of the material, starting with the head of the rod to the cutter is not made of a particularly short length, and the material has no guidance. Consequently, only materials of a relatively large diameter can be advantageously utilized.

U.S. Pat. No. 1,733,263 describes a machine for heating and cutting articles of metal. In this arrangement, the wire material is fed to the separating device with intermittent motion, starting from an unreeling means. The feed rollers are arranged in superimposed relationship and have imparted to them a jerk-like rotary motion by means of complex devices respectively associated with the rollers. Merely a single-thread screw is provided in this installation for driving the chuck, which latter is disposed at a spacing from the feed rollers. The operation of such a machine, comprising a considerable number of rotating and otherwise movable masses results in a relatively low production output of parts the servicing of such machine being furthermore expensive.

U.S. Pat. No. 3,030,642 shows a device wherein the wire material is intermittently moved over conveying rollers. These rollers, arranged in mutual opposition, each comprise a projecting sector with a cutout corresponding to the material to be conveyed, while the remaining peripheral zone is excluded from entraining the material. In this arrangement, it is extremely disadvantageous that, whenever a change is made from one material cross section to another, a special roller pair must be provided.

In the cold swaging machine according to British Pat. No. 2,017,553, a grave disadvantage is that the shearing means is mounted by way of complex angular levers carrying the shearing blade, which levers are under cam and spring action.

German Pat. No. 2,211,261 shows a device for shearing off wire sections in stub lathe presses, ball presses, or roller presses. In this arrangement, the casters of the shearing levers run along two separate cams, the casters lying on a circular arc outside of the rotating shaft carrying the cams. Shearing off of the wire is accomplished by way of a very expensive arrangement of pressure bars and spring systems, the wire end being severed by a shearing means arranged on the shearing lever; this separating step does not take place after the material has been introduced into the die.

The conventional machines have the drawback in common that the generally chosen principles have not contributed toward increasing output and quality of finished parts to an appreciable extent.

It is an object of the invention to provide a machine for the continuous shearing off and cold swaging of parts wherein the wire length to be transported can be adjusted by rotating the feed discs, the presetting being carried out by the mutual rotation of the radially serrated end faces of the feed discs and/or of the associated hub, and wherein the feed discs are positively driven.

Finally, it is an object of the invention to achieve the swaging of lightweight bolts and rivets, starting with wire material.

The invention will be explained in greater detail with reference to several embodiments. In the drawings.

Figure 1:
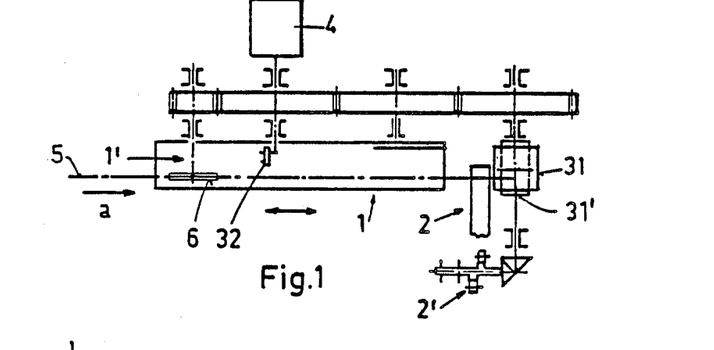
FIG. 1 is a schematic view of the arrangement of components characterizing the machine, as seen from above.

According to the illustration in FIG. 1, a feeding mechanism 1' for the material, a shearing device 2, an impact slide 1, and a chuck 31 equipped with collets and moved with intermittent rotary motion are arranged along the sides of a U, in an approximately horizontal plane, in a machine frame and can be driven together by a single motor 4.

The material 5, fed in the direction of arrow a (FIG. 1) into the machine, especially in the shape of a wire with a round cross section and made of metal, is first of all conveyed by means of at least one disc pair 6 (FIG. 10) for the entrainment of the wire, arranged in superimposed relationship in one plane and rotating in opposite directions. A groove 7 having a semicircular cross section is provided in the periphery of each of the discs 6, so that the cross section of the two half grooves 7 formed with a small peripheral clearance k (FIG. 5) of the discs corresponds approximately to the cross section of the material to be worked, this cross section being round or optionally of some type of polygonal configuration.

The discs 6 are detachably mounted in a forward end zone, oriented toward the impact slide 1, by way of a hub 6' (FIG. 5) fixedly attached on a shaft 8, and they can be driven by means of gear wheels 9, 10 (FIG. 4) in opposite directions of rotation.

Figures 4, 5, 6, 7, 8, 9, 10, 11, 12:
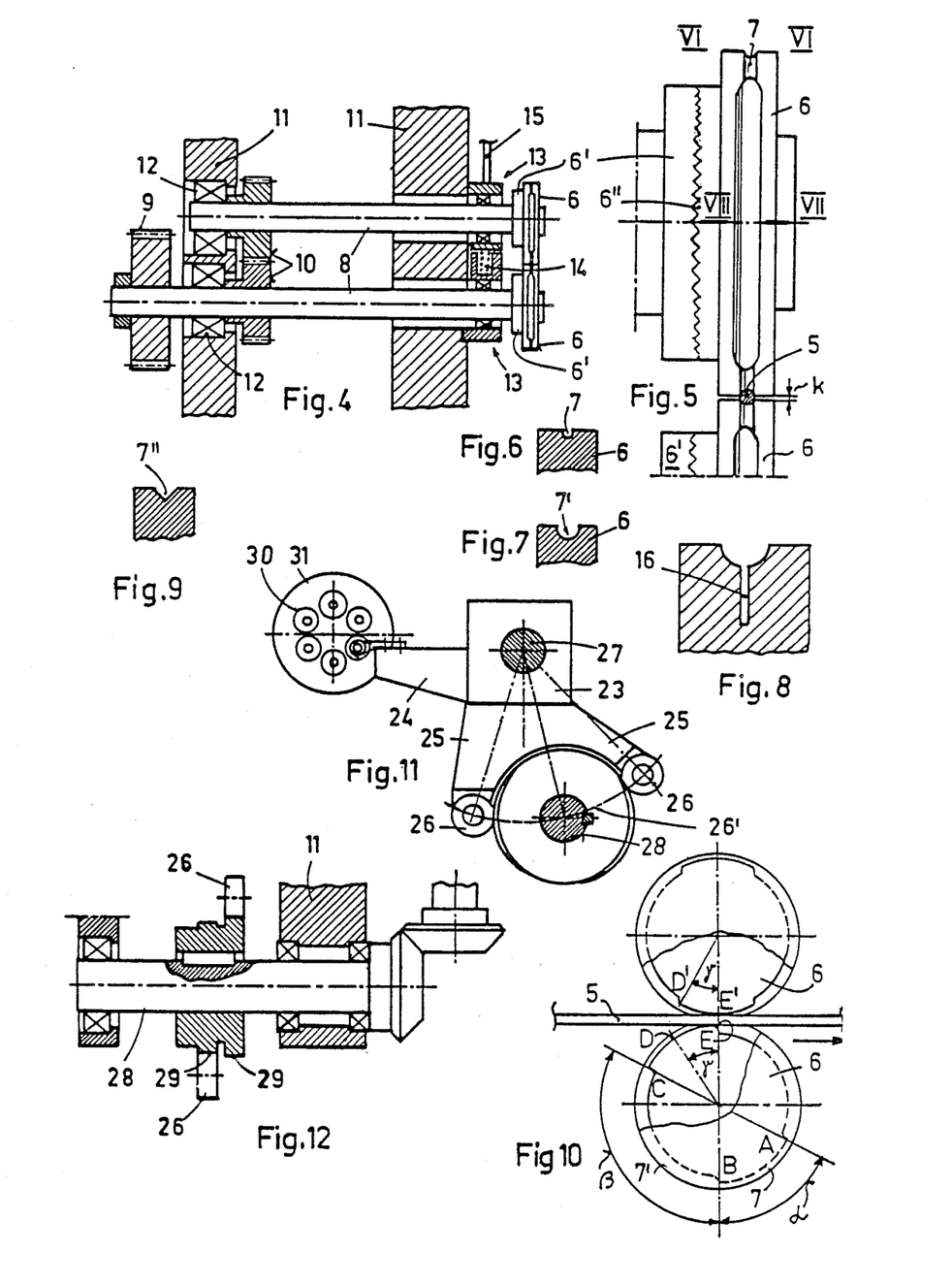
FIG. 4 is a schematic view of the drive mechanism and the bearing of an arrangement of driven discs for feeding the material to the separating unit, corresponding to detail 1' in FIG. 1.
FIG. 5 shows, on an enlarged scale, a partial lateral view of the entraining discs according to FIG. 4.
FIG. 6 shows an axial section along line VI—VI in FIG. 5, limited to the outer peripheral zone of the discs only, the illustrated cross section of the groove corresponding approximately to the cross section of the material to be conveyed.
FIG. 7 shows a partial section similar to FIG. 6, but along line VII—VII in FIG. 5, with a larger cross section of the groove.
FIG. 8 shows, on an enlarged scale, a sectional view similar to FIG. 6 with a slot worked peripherally into the base of the groove.
FIG. 9 shows a view similar to FIG. 7 with a modified version of the groove.
FIG. 10 shows a schematic view, partially broken away, of the entrainment discs according to FIGS. 4 and 5.
FIG. 11 shows a schematic view of the shearing device indicated at 2 in FIG. 1, in the direction of feeding of the material.
FIG. 12 is a schematic view, partially in section, of the bearing for a cam pair, indicated at 2' in FIG. 1, for the pivotal motion, in a vertical plane, of the shearing means indicated at 2 in FIG. 1.

As can be seen from FIG. 5, a radially directed serration 6'' is provided along the periphery or part of the periphery of the contacting end faces for power transmission between the disc 6 and the associated hub 6', so that the mutually associated disc and hub, or the discs with respect to each other, can be angularly displaced by the additional use of screws, which latter are not illustrated in detail.

The drive shafts 8 are furthermore mounted to be laterally displaceable with respect to the machine frame 11, in pendulum bearings 12 (FIG. 4), in the end zone disposed in opposition to the discs 6, so that the discs can be slightly moved apart with respect to each other or, for entrainment of the material, and be moved so that their end faces come into contact with each other. For this purpose the bearing points 13 of the shafts 8 located in the vicinity of the discs 6 are designed to be vertically displaceable and are acted upon in opposed directions by an interposed, tensioned compression spring 14. To exert a force counteracting the compression spring 14 and/or to execute an approaching motion of the discs 6 for ready clamping and thus secure entrainment of the material, a piston rod 15, actuated, for example, hydraulically or pneumatically, exerts a pressure on at least the upper bearing point 13.

According to the invention, the material 5 is fed into the die with intermittent, rather than uniform motion. The positively executed feeding of the material and/or wire 5 tangentially to the discs 6 takes place respectively along only a portion of the circumference of the discs, i.e. along an arc A-B (FIG. 10) of a sector having a center angle of maximally $\alpha = 90°$ or a maximum arc of $0.5\pi$; along a subsequent arc B-C of at least $\beta = 90°$ or a minimum of $0.5\pi$ any entrainment by the discs is eliminated. Also, the provision is made that the clamping distance occupies the same portion of 360° as the stationary condition.

However, advantageously, the respective clamping distance A-B, C-E, in one rotary motion of the discs, is smaller, i.e. limited to the arc D-E and D'-E' shown in FIG. 10, the corresponding center angle $\gamma$ being variable from 90°, i.e. $0.5\pi$, down to zero degrees.

The desired length of the material to be fed for the swaged component to be respectively manufactured is presettable by the aforementioned possibility of mutual rotation of the discs and/or of the arc entraining the wire, provided by the serration 6'' included in the arrangement.

This intermittent entrainment is in temporal synchronism with the movements of the shearing device 2, the impact slide 1, the collets or dies 30, and the chuck 31 receiving the dies. To achieve the above-described, intermittent feeding motion of the material, the aforementioned groove 7, advantageously shaped as a semicircle or a wedge-like cutout 7'', is designed along the arc B-C of the discs with a cross section 7' which is larger than the diameter of the material (FIGS. 7, 10), so that any entrainment of the material by the discs is precluded.

Advantageously, an annular narrow slot 16 (FIG. 8) can be provided in the base of the groove 7, this slot being narrower than the diameter of the groove, wherein the groove 16, for the positive entrainment of the material 5, can be elastically expanded.

The intermittent motion of the material along its route to the shearing device 2, which motion occurs synchronously with respect to the subsequent operating steps, prevents any buckling of the material, i.e. of the wire, while the predetermined partial section is introduced into the die and while the section is sheared off.

Figure 2:
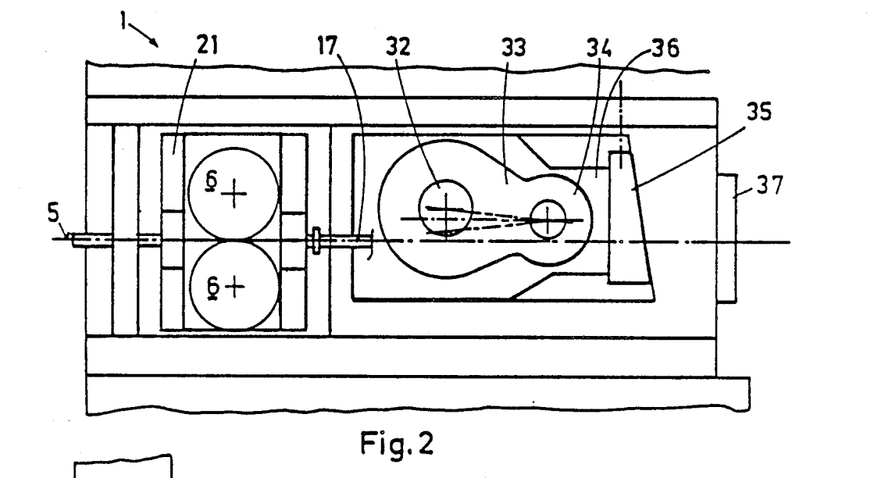
FIG. 2 is a schematic lateral view of the impact slide indicated by numeral 1 in FIG. 1.
Figure 3:
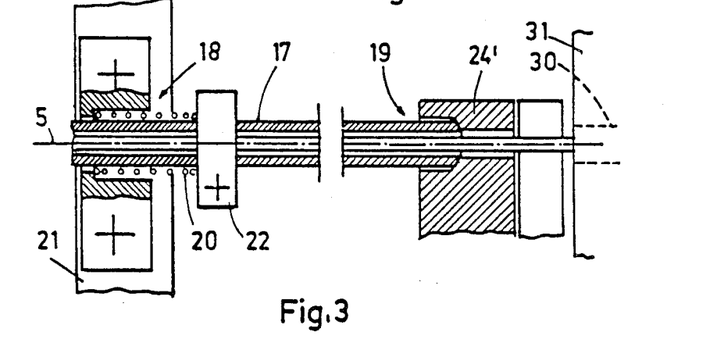
FIG. 3 shows the bearing of the guide means for the material to be cut and swaged in the machine.

To enhance the thus-attained advantage, a tube 17 is provided as guide means for the material directly after exiting of the latter from the discs 6 (FIG. 3). As mentioned above, an initial end zone 18 of the tube 17 is mounted in an articulated fashion close to the exit of the wire from the discs 6, and the second end section 19 is likewise mounted in an articulated fashion laterally in the shearing device 2 and more particularly in the cutter 24', which is pivotable in a vertical plane. Thus, it will be understood that what is shown in the right-hand portion of FIG. 2 occupies the broken-away central portion of FIG. 3.

Additionally, the tube 17 is subject to the action of a prestressed compression spring 20 along the initial end zone 18, this spring being supported, on the one hand, against the fixed frame 21 enclosing the discs 6 and, on the other hand, against an adjusting ring 22 displaceably mounted on the tube 17. In this way, end section 19 of tube 17 is pressed yieldably into a recess in cutter 24',- thereby permitting limited movement of end section 19 in this recess.

Consequently, the material is transported in the machine absolutely linearly and free of vibrations. Especially since the discs 6 are arranged in the very close proximity of the shearing device, the length of the material fed with intermittent motion turns out to be of a very short dimension.

In short, even if the material is continuously unreeled from a reel (not shown) arranged outside of the machine, the required workpieces, such as, for example, bolts and rivets, are in reality obtained starting with a precisely aligned rod of limited length.

The shearing unit 2 FIGS. 11, 12 and 18-20) comprises an element 23 with an approximately horizontally projecting support 24 for the mounting of cutter 24', and two spread-apart, downwardly extending arms 25, a roller 26 being freely rotatably attached to the outer end of each of these arms. The element 23 is mounted to be freely swingable about a horizontally arranged shaft 27, the axis of the shaft extending in parallel to the axis of the material 5.

At a distance from the shaft 27, a shaft 28 is arranged therebelow, this shaft 28 being directly driven by the motor 4 by interposition of conventional power-transmitting members, and being rotatably supported with respect to the machine frame 11. Two cam discs 29 are fixedly attached to the shaft 28, the respective centers of curvature of the cam surfaces being arranged so that the aforementioned rollers 26 are positively guided along the cam surfaces and/or roll along such surfaces essentially without any play, thus imparting to the cutter the required pivotal motion about shaft 27 for shearing off the entire cross section of the material.

In this connection, the axes of the rollers 26 are located on a circular arc 26', the axis of the shaft 27 representing the center of this arc.

Figure 18:
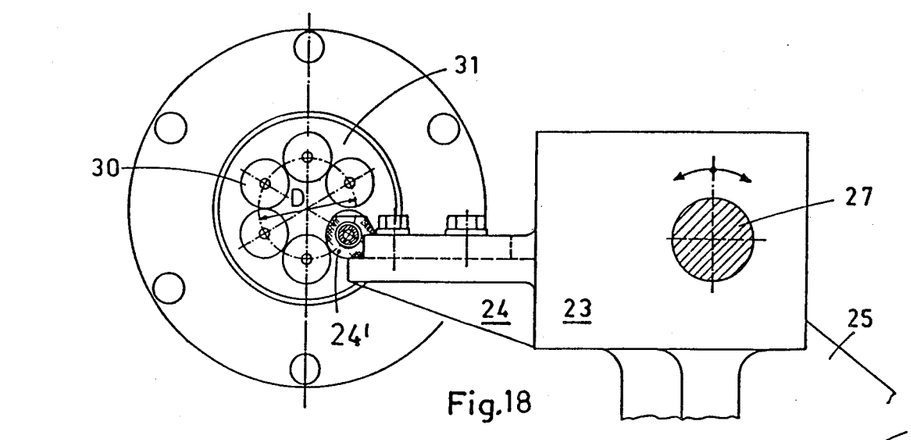
FIG. 18 is an enlarged fragment of FIG. 11.
Figures 19, 20:
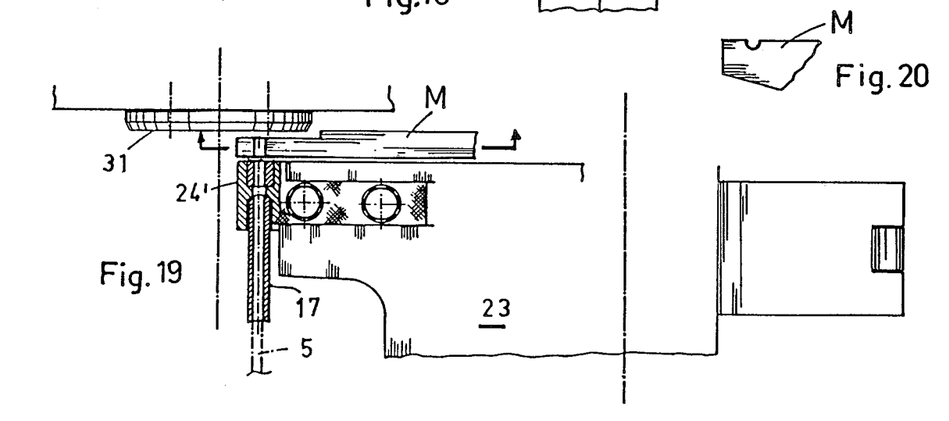
FIG. 19 is a detail of the structure shown at the right side of FIG. 3, and showing further details thereof.
FIG. 20 is a fragmentary view of the stationary cutting support, viewed from the direction in which the workpiece approaches the same.

Shearing off a portion of the workpiece takes place as follows:

With the parts in their position of FIGS. 11 and 18, the intermittent advance of the workpiece by means of the discs 6 feeds the workpiece not only through tube 17 but also through cutter 24' and a stationary support M shown in FIGS. 19 and 20, and more particularly through the upwardly open recess in that support, and thence into one of the hollow dies in chuck 31. These dies are open toward the advancing workpiece but are dead-ended, that is, are not in the form of through holes, so that the closed end of the die will serve as one of the working surfaces thereof.

With the workpiece thus fully advanced through cutter 24' and support M and received in the aligned die 30, shaft 28 is rotated, to swing element 23 counter-clockwise as seen in FIGS. 11 and 18, so that cutter 24' shears off the workpiece between itself and support M. Rotation of chuck 31 takes place at increments of 60° in the illustrated embodiment, and in a counterclockwise direction as seen in FIGS. 11 and 18, so that the sheared-off section of workpiece is lifted by the die 30 that receives it, out of the upwardly open groove in support M and is moved successively into the counterclockwise disposed positions shown in FIGS. 11 and 18. Stepwise rotation of chuck 31 is effected by an indexing device 31' whose cam displaces chuck 31 the required 60° upon each actuation, this structure being illustrated in detail and further described hereinafter in connection with FIG. 21.

When the workpieces are thus held n chuck 31 and are rotated counterclockwise away from their position as shown in FIGS. 11 and 18, they are subjected to a swaging action by one or more swaging tools mounted on the impact slide 1.

Figure 13:
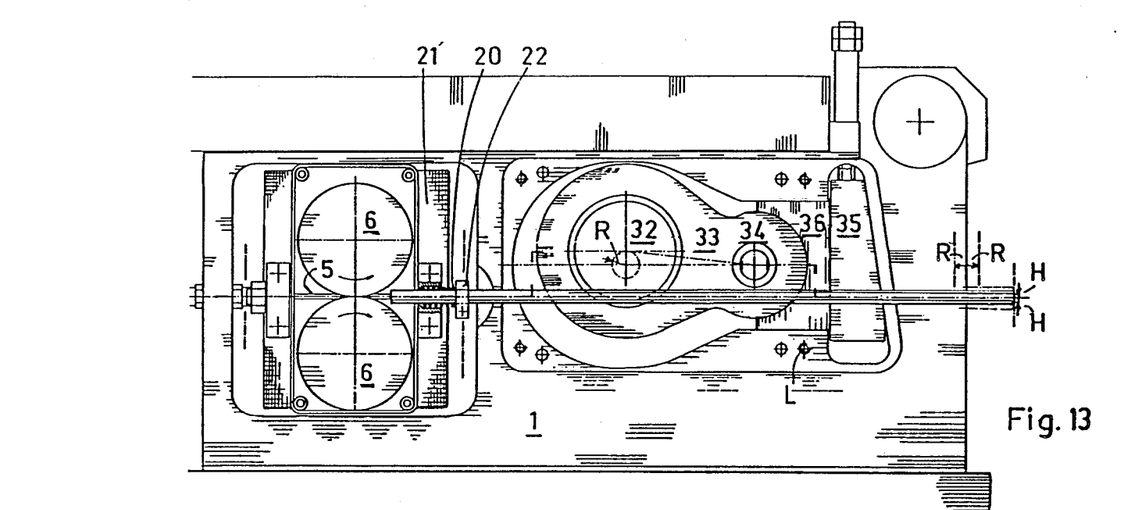
FIG. 13 is a view similar to FIG. 2 but showing the impact slide in greater detail.

As best seen in FIG. 13, this slide 1 is mounted for horizontal sliding movement parallel to tube 17, and surrounds stationary frame 21 and so reciprocates relative to frame 21.

Figure 14:
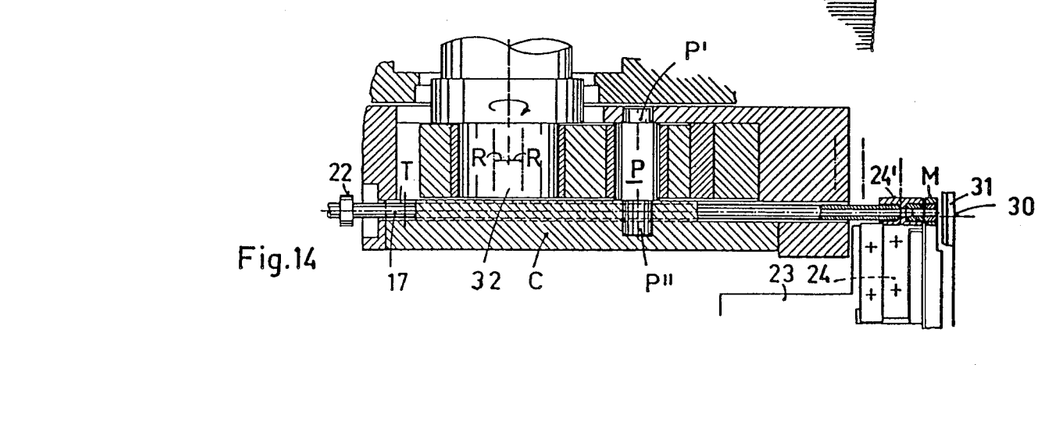
FIG. 14 is a fragmentary cross-sectional view taken on the broken line of FIG. 13.

Horizontal sliding of slide 1 is effected by a circular eccentric 32 that has a shaft R driven by the motor 4, the circular eccentric 32 rotating in a crank 33 which has an endpiece 34 that receives a pin P (FIG. 14) whose end P' is received in slide 1 and whose other end P" is received in a cover C which in ordinary use would hide the assembly 32-34 and which is shown in FIG. 14 but has been removed in FIG. 13. Screws L normally hold cover C to slide 1.

Because the impacts to which slide 1 is subjected would be too great to be borne by the ends of pin P alone, a socket 36 is provided, secured to slide 1, in which endpiece 34 has limited rotatable movement. To make sure that socket 36 is properly adjusted, a fitting element 35 in the form of a wedge is adjustably positioned between socket 36 and an inclined surface of slide 1.

Figure 15:
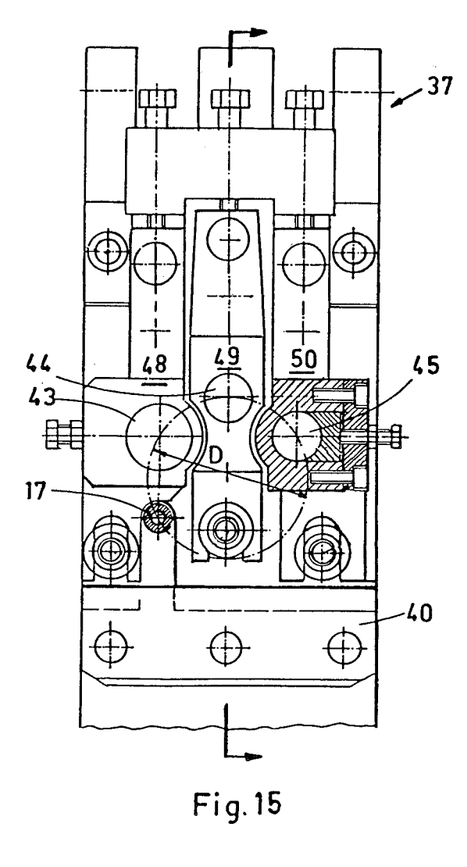
FIG. 15 is an end view of the impact slide, with parts in section, showing the right hand end thereof as viewed in FIGS. 2 and 13, but with the swaging rams and their holder in place.
Figure 16:
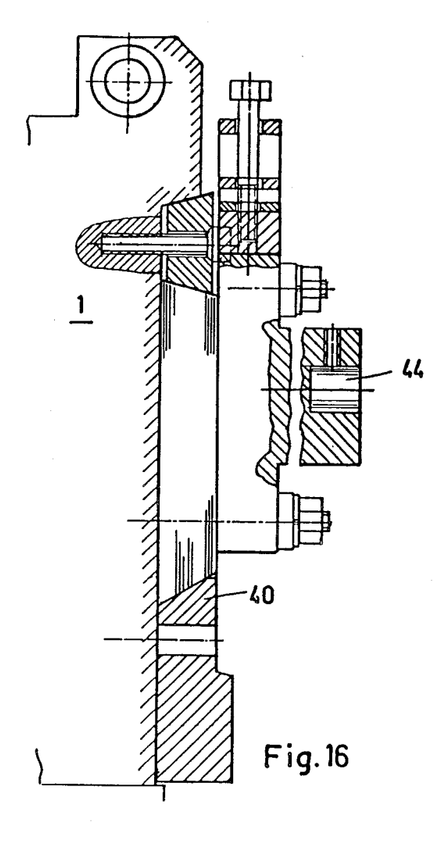
FIG. 16 is a cross-sectional view taken on the section line of FIG. 15.
Figure 17:
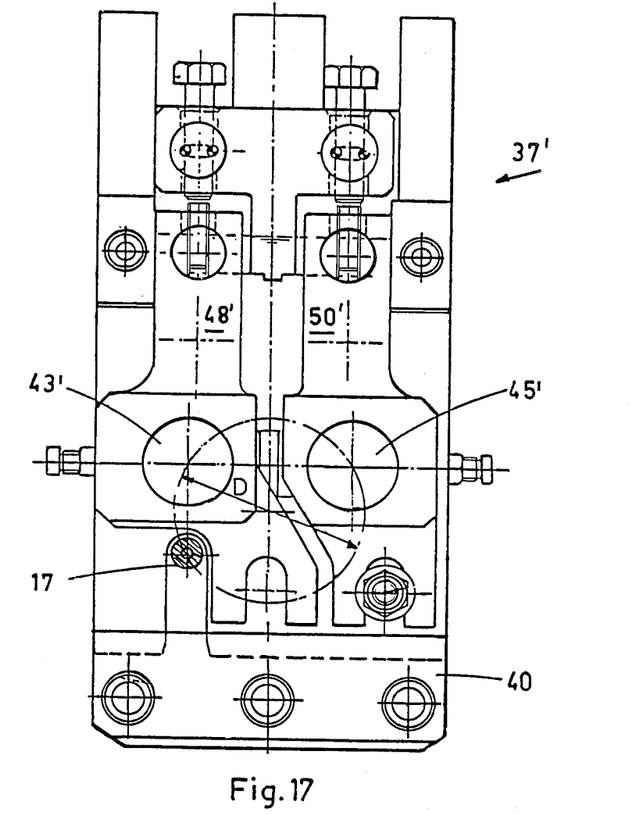
FIG. 17 is a view similar to FIG. 15 but showing a modified form thereof.

As broadly seen in FIG. 2, and as seen in detail in FIGS. 15-17, slide 1 has, on its side adjacent the chuck 31, a swaging tool holder generally shown at 37. Broadly, the purpose of 37 is to hold one or more swaging tools, which will be brought to bear with impact by the slide 1 against the shorn-off workpieces held by chuck 31 in the blind dies 30, thereby to shape the workpieces as desired into the form of screws, bolts, etc.

To this end, holder 37 comprises a base 40 secured to slide 1 by screws. FIGS. 15 and 16 show a first embodiment of this holder, and FIG. 17 shows a second embodiment thereof. These embodiments differ principally in that the embodiment of FIG. 15 is adapted to hold three tools in the form of punches or the like; and that of FIG. 17 is adapted to hold only two. These tools are not shown in FIGS. 15-17. Instead, the bores 43, 44, 45 and 43', 45' for receiving and releasably retaining these tools are shown, in the respective tool holders 48, 49, 50 and 48' and 50'.

Notice especially the imaginary circles shown in broken lines in FIGS. 15, 17 and 18, whose diameter is D. On one of these circles (FIG. 18), all of the dies 30 lie, with their axes parallel to the axis of the circle. On the other of these circles (FIGS. 15 and 17), all of the bores 43, 44, 45 or 43', 45' lie. Notice, however, and this is a very important feature of the present invention, that the axis of tube 17 also lies on these latter imaginary circles imposed on the holder 37.

Another very important feature of the invention is that the circles of FIGS. 15 and 17, are coaxial with that of FIG. 18, and that the diameters of both of the circles are equal.

Also, each of the bores 43, 44, 45 of FIG. 15, or 43', 45' of FIG. 17, as well as the tube 17 in both of FIGS. 15 and 17, will be coaxial with one of the dies 30 of chuck 31 in all of the stopped or operative positions of chuck 31.

It follows from this, that each time the slide 1 advances to the right as seen in FIG. 2, any tool held in any of the bores of holder 37 will strike the adjacent end of a shorn-off workpiece held by a die 30, thereby to perform at least a portion of the swaging operation. It will also be understood that, if the number of tools on holder 37 is less than five, then in the illustrated configuration, not every workpiece will receive a swaging stroke at every dwell of the chuck 31. But this does not matter, because every tool held by holder 37 will perform a work operation on every workpiece, regardless of the number of tools on 37 and regardless of the number of workpieces on chuck 31.

Figure 21:
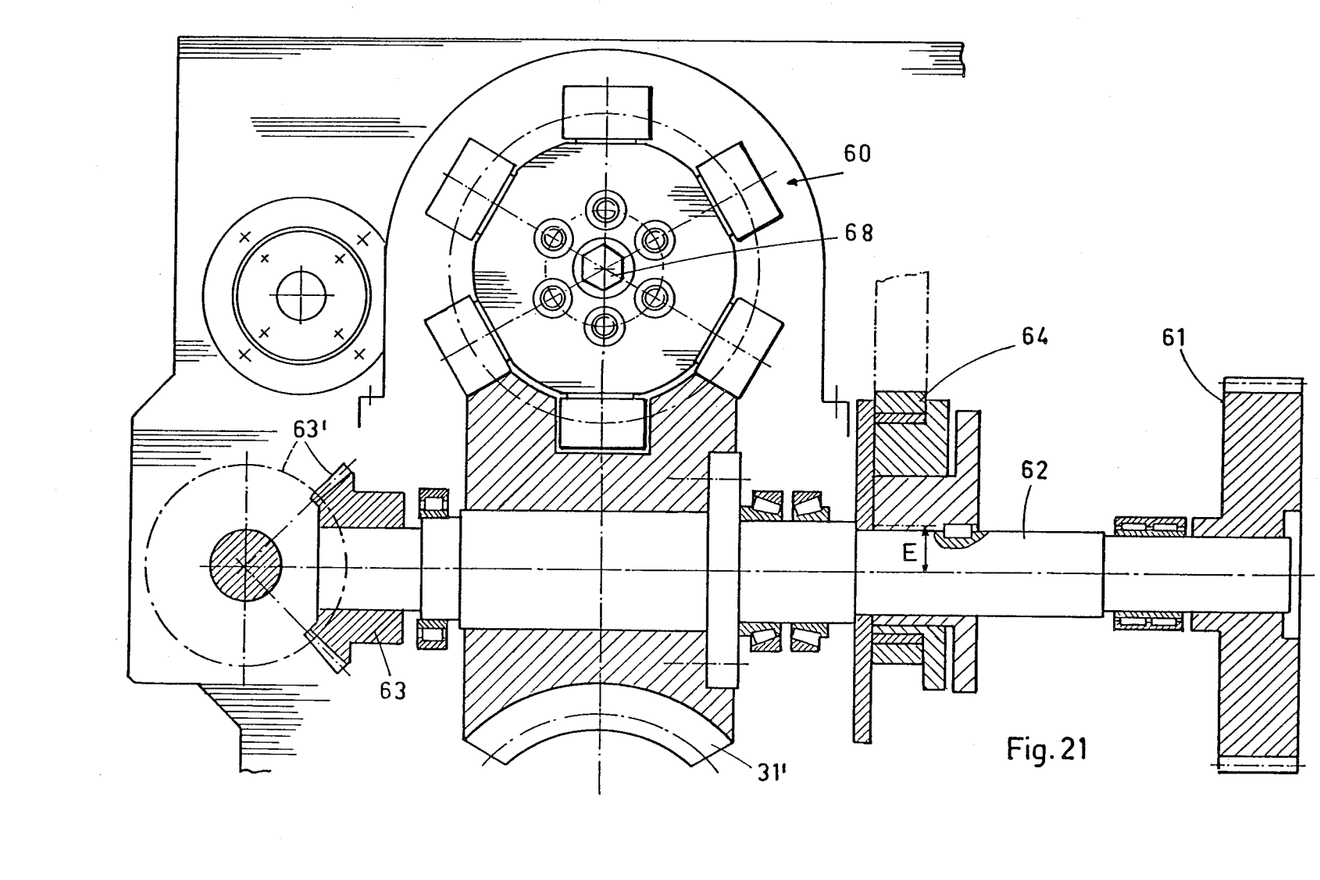
FIG. 21 is a fragmentary view of the mechanism for indexing the rotary work holder.

FIG. 21 shows how the chuck 31 is indexed by increments of 60°. A gear 61 driven by motor 4 rotates a shaft 62 on which is also mounted bevel gearing 63, 63' for rotating the cams 2' to actuate shear 2. Also mounted on shaft 62 is the indexing device 31, in the form of a worm having a peripheral groove thereon that is helical at its ends and annular between its ends. The ends of this groove overlap, and receive successively the lugs on a driven wheel 60 that is secured by bolt 68 to chuck 31, as seen best in FIG. 22. In operation, when shaft 62 turns and turns also the indexing device 31, one of the lugs on driven wheel 60 will be engaged in the peripheral groove of 31'. When this lug is disposed in the annular, that is, the part-circular portion of the groove, then wheel 60 will not move and this will effect a dwell of chuck 31 during which a work operation can be performed on the workpieces. But when 31' is turned to the point that the lug on driven wheel 60 enters a helical end portion of the groove, then indexing through 60° will take place, the next successive lug being forced into the other overlapping end of the groove, to repeat the indexing- dwell-indexing movement to which the previous lug was subjected.

Figure 22:
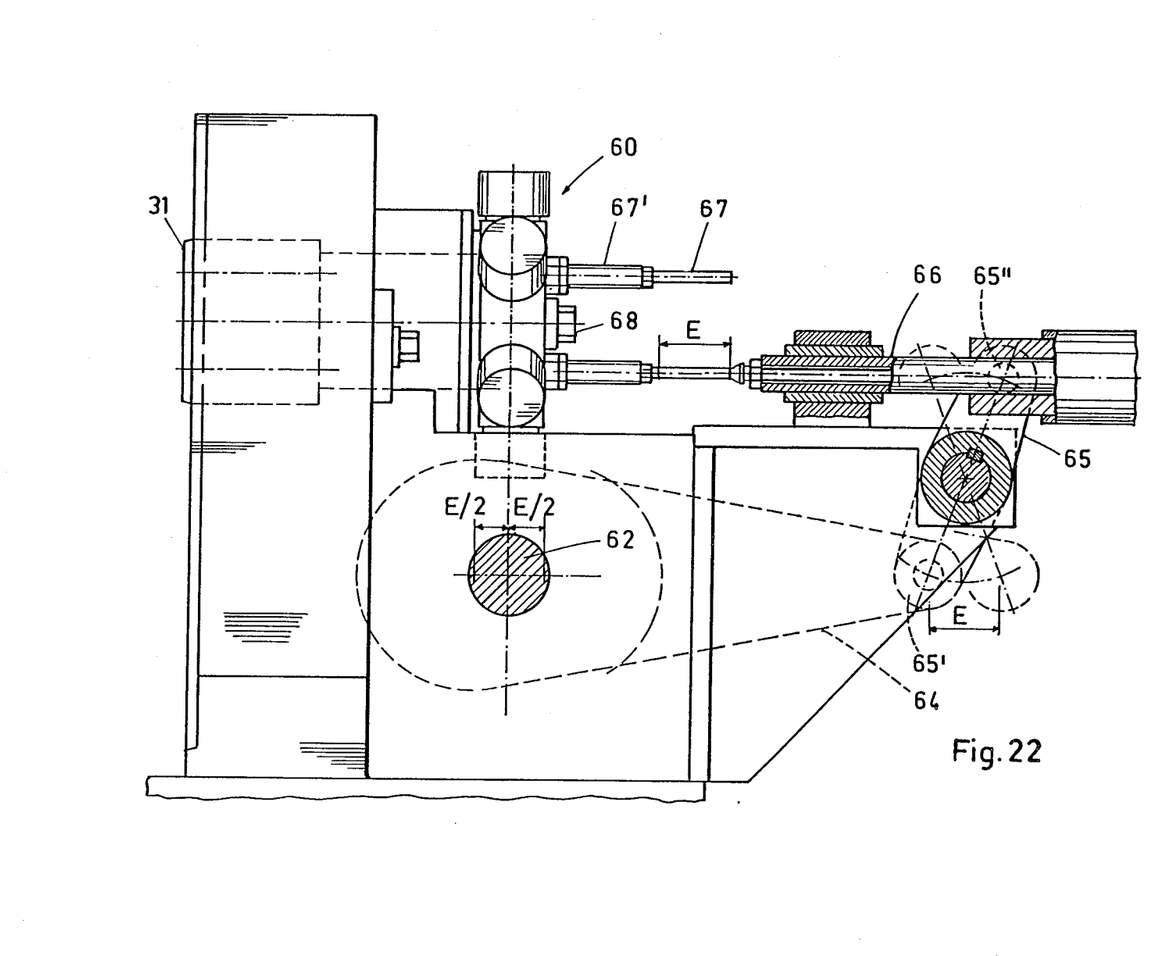
FIG. 22 is a fragmentary view of the mechanism for ejecting finished workpieces from the work holder.

FIG. 21 also shows a crank 64 driven in a circular path by an eccentric on shaft 62, whose eccentricity or throw is indicated at E. Turning to FIG. 22, it will be seen that crank 64 causes oscillatory movement of a lever 65 whose one end 65' is pivotally secured to crank 64 and swings through a path E, and whose other end 65" is secured to a plunger 66 that accordingly has a throw E. Plunger 66 contacts successive pins 67 that slide in housings 67' and that extend to the left of FIG. 22 all the way to chuck 31 to serve as ejector pins. The plunger 66 contacts each pin 67 in succession, in the lowermost or eject position of the pins, to eject the finished workpiece from chuck 31. Coil compression springs (not shown) within housings 67' return pins 67 to their rightmost position shown in FIG. 22.

From a consideration of the foregoing disclosure, therefore, it will be evident that the objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for the continuous shearing off and swaging of metal workpieces, comprising a feeding device for the lengthwise feeding of elongated material, shearing means, an impact slide, and a chuck studded with dies and moved with intermittent rotary motion, said feeding device comprising means to move the material in parallel to the slide intermittently by means of power driven opposed feed discs rotating in opposite directions and having interrupted grooves in their peripheries, the slide having swaging tool holders thereon, said tool holders and the material lying on a first imaginary circle, the path of said dies comprising a second imaginary circle which is coaxial with and of the same diameter as said first imaginary circle, each of said tool holders and said workpiece being coaxial with a said die in each stopped position of said chuck.

2. Apparatus as claimed in claim 1, said feed discs having radially serrated end faces releasably mating with radially serrated end faces of associated hubs for driving said discs, whereby the length of material fed is adjustable by releasing and relatively rotating and re-engaging said radially serrated end faces.

3. Apparatus as claimed in claim 1, and a narrow annular slot in the feed disc at the base of the grooves, said slot being narrower than the cross section of the groove, so that the groove is elastically expandable for the positive entrainment of the material.

4. Apparatus as claimed in claim 1, and a tube comprising guide means for the material directly after the material leaves the discs, the tube being mounted in articulated fashion at one end in close proximity to the exit of the material form the discs against a stationary frame encompassing the discs, the other end of the tube having relatively movable connection with a cutter pivotable in a plane perpendicular to the tube for movement with the cutter in said plane for shearing off lengths of the material, and spring means pressing the tube against the cutter.

5. Apparatus as claimed in claim 1, and a motordriven eccentric circular crankpin that rotates in one end of a crank that has an oscillatory connection to the slide at the other end of the crank.

6. Apparatus as claimed in claim 1, and a piston for regulating the contact pressure of the discs against the material to be conveyed.

7. Apparatus as claimed in claim 1, said shearing means comprising a cutter through which the material extends, means mounting the cutter for swinging movement about an axis parallel to the length of the material, power means for swinging the cutter about said parallel axis, and a fixed support against which the cutter shears off the material, said fixed suport having an open recess therein that is in alignment with one of the dies in every stopped position of the chuck.

* * * * *